H. M. ROBERTSON.
HOSE COUPLING LOCK.
APPLICATION FILED AUG. 9, 1909.
958,437.
Patented May 17, 1910.
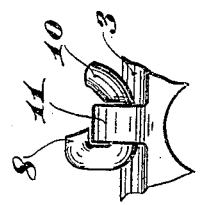
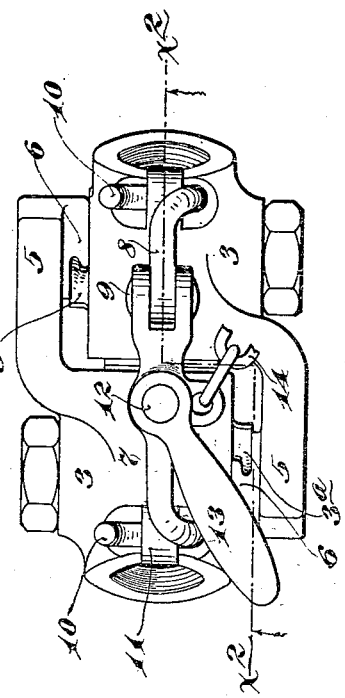
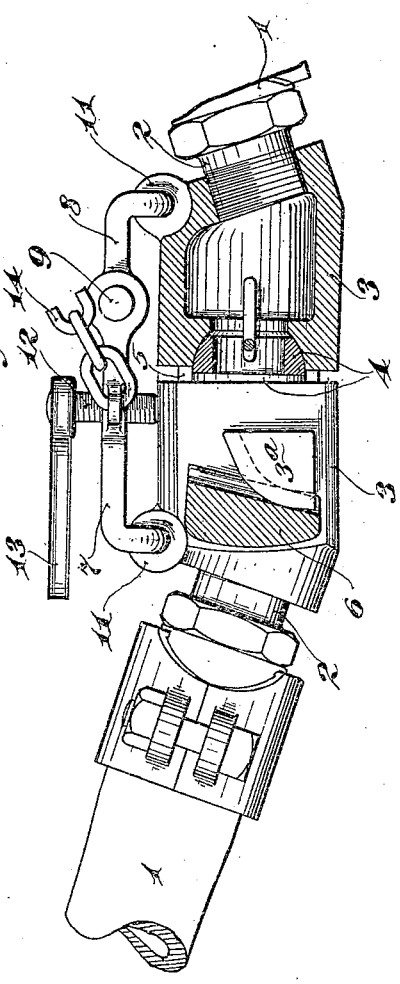
Witnesses:
L. L. Simpson
E. C. Skinkle
Inventor:
H. M. Robertson
By his Attorneys:
Williamson & Merchant

UNITED STATES PATENT OFFICE.

HENRY M. ROBERTSON, OF ST. PAUL, MINNESOTA, ASSIGNOR TO GOLD CAR HEATING & LIGHTING COMPANY, OF NEW YORK, N. Y., A CORPORATION OF NEW YORK.

HOSE-COUPLING LOCK.

958,437.  Specification of Letters Patent.  Patented May 17, 1910.

Application filed August 9, 1909. Serial No. 511,905.

*To all whom it may concern:*

Be it known that I, HENRY M. ROBERTSON, a citizen of the United States, residing at St. Paul, in the county of Ramsey and State of Minnesota, have invented certain new and useful Improvements in Hose-Coupling Locks; and I do hereby declare the following to be a full, clear, and exact description of the invention, such as will enable others skilled in the art to which it appertains to make and use the same.

This invention relates to hose-couplings such as are used to couple the ends of steam hose between cars of railway trains. In such hose-couplings the complementary coupling heads are arranged to interlock, the one with the other, and to form between them a steam-tight joint, the interlocking being effected by a downward movement of the two heads toward each other and the disengagement by an upward movement from each other, the weight of the parts being relied upon generally to hold the two heads in engagement. In the absence of a positive lock of any kind an accidental disengagement or separation of the two heads sometimes takes place and it is the object of this invention to provide, in addition to the usual interengaging devices and independently thereof, a safety lock which shall effectually prevent such accidental disengagement or separation and insure the maintenance of a tight joint between the two heads, while at the same time it shall permit the ready engagement or disengagement thereof at will. The invention by which this object is attained will be fully described hereinafter with reference to the accompanying drawing, in which it is illustrated as embodied in a suitable construction applied to a hose coupling of ordinary form, and in which—

Figure 1 is a top view of the coupling with the improved locking device applied thereto. Fig. 2 is a view of the same in section, on the irregular plane indicated by the broken line x—x of Fig. 1, a portion of one hose section and the connecting sleeves being also shown. Fig. 3 is a detail view.

The hose sections, one of which is shown at 1, are connected by sleeves 2 with the complementary coupling-heads 3, the opposing ends of which are formed, as at 4, to make a tight point when the coupling-heads are interlocked. The two heads are formed as usual with reversely offset arms 5, each of which is provided with a cam-flange 6 to coöperate with a corresponding cam-flange $3^a$ on the same side of the other head, these or any other usual or suitable devices constituting interlocking means by which the two heads are interlocked to hold the heads together with a steam-tight joint, the weight of the parts, acting through the coöperating cam-flanges ordinarily maintaining the heads in the desired relation. Sometimes, however, a blow from beneath or the jumping of the cars effects an accidental disengagement or separation of the heads or a loosening of the joint at 4 and it is to prevent this that the locking device now to be described is provided, such locking device, it will be understood, being independent of and additional and supplementary to the interlocking means above referred to.

In the construction shown in the drawing the locking device comprises a toggle link consisting of two members 7 and 8 which are pivotally connected with each other, as at 9, and are connected severally with the two heads 3 near their remote ends, each member 7 and 8 preferably having, as in the construction shown, a laterally bent hooked end 10 adapted to be hooked from the same side through an eye or perforated lug 11 on the top of the corresponding head 3. For the purpose of buckling the toggle upward or away from the heads and therefore forcing or holding the adjacent ends of the heads 3 downward and drawing the heads together so as to maintain a tight joint between their ends, as at 4, one of the members of the toggle, as 7, being preferably somewhat longer than the other, 8, is provided with a screw 12 adapted to bear against the top of one of the heads 3, near its outer end and between the points of attachment 11 on the two heads, such screw preferably having a fixed operating handle or lever 13. The two members 7 and 8 of the toggle, if inseparably pivoted together as indicated in the construction shown, are simultaneously connected with the two heads, when they are brought together, by hooking the ends 10, through the eyes 11 of the heads 3 and the toggle is then buckled upward or away from the heads, to pull the two heads together and to press their adjacent ends downward, by screwing home the screw 12 against the corresponding head 3. Upon loosening the screw 12 the toggle may be quickly disengaged from the heads by unhooking the members 7 and 8 from the heads, thereby permitting the two heads to be separated in the usual manner. A chain 14 may be connected to the toggle and to the car body or otherwise for the purpose of preventing the loss or displacement of the toggle when the heads are disengaged.

Various changes may be made in the details of construction and arrangement of the toggle devices to suit different forms of couplings and the invention, therefore, is not limited to the precise construction shown and described.

I claim as my invention:

1. The combination with hose-coupling heads provided with interlocking means whereby the heads are held together normally, of a toggle connected to the heads and means to buckle the toggle away from the heads to prevent the accidental separation thereof.

2. The combination with hose-coupling heads provided with interlocking means whereby the heads are held together normally, of a toggle comprising members pivotally connected to the heads and a screw carried by one of the members and arranged to bear against one of the heads to prevent the accidental separation of the heads.

3. The combination with hose-coupling heads provided with interlocking means whereby the heads are held together normally, said heads having eyes near their remote ends, of a toggle having hooked ends to engage said eyes and means to buckle the toggle away from the heads.

In testimony whereof I affix my signature in presence of two witnesses.

HENRY M. ROBERTSON.

Witnesses:
ALICE V. SWANSON,
HARRY D. KILGORE.